D. L. & J. M. BARLOW.
Grain-Drill.
No. 45,903. Patented Jan. 17, 1865.
Fig. 3.
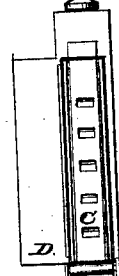
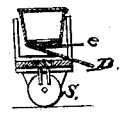
Fig. 4.
Fig. 1.
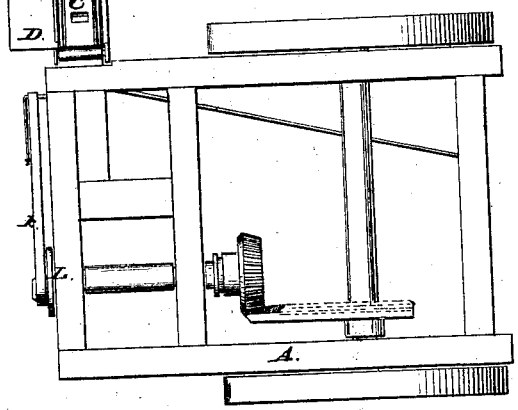
Fig. 5.
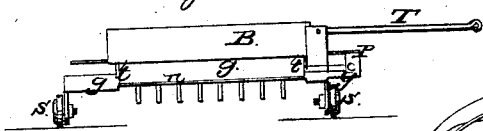
Fig. 2.
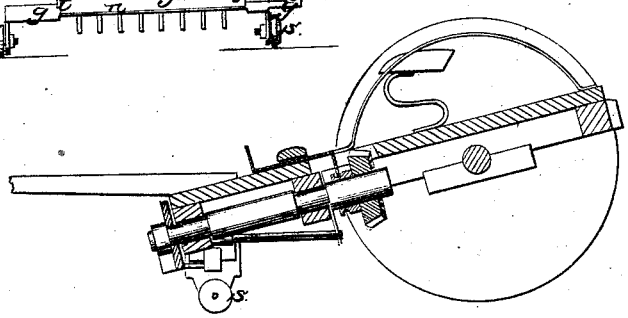
Witnesses.
Inventor.

UNITED STATES PATENT OFFICE.

DANIEL L. BARLOW AND JOHN M. BARLOW, OF COHOCTAH, MICHIGAN.

IMPROVED HARROW AND SEEDER.

Specification forming part of Letters Patent No. 45,903, dated January 17, 1865.

*To all whom it may concern:*

Be it known that we, DANIEL L. BARLOW and JOHN M. BARLOW, of Cohoctah, Livingston county, Michigan, have invented certain new and useful Improvements in Oscillating Harrows and Seeders; and we hereby declare that the following is a true and exact description of the same, reference being had to the accompanying drawings, and to the letters of reference marked thereon.

The nature of our invention consists in combining an oscillating harrow with a seeder, in the manner and for the purpose hereinafter described.

Figure 1 in the annexed drawings exhibits a plan view of the carriage to which our invention is attached. Fig. 2 represents a vertical section of the same. Fig. 3 is a plan view of the harrow reversed. Fig. 4 represents a cross-section of the harrow and seeder. Fig. 5 designates a front elevation of the harrow with seeder attached.

The letter A, Fig. 1, represents the carriage with the motive power designed to operate our oscillating harrow. The harrow can be attached to either a reaping machine or other wheeled carriage used in farming operations.

B, Fig. 3, represents a plan view of the seeder with top removed, and consists of an oblong box of suitable depth with perforations at the bottom to admit of the passage of the seed to the earth.

A small distance above the bottom of seed-box B is the slide C, which has openings in it corresponding in size and number with the perforations in B. The slide C is intended to have a reciprocating motion, as shown hereinafter, so as alternately to open and close the openings in the seed-box B.

D represents an apron placed under the seed-box B to catch the grain as it falls through the perforations in B and convey it to the earth. The apron D descends from the seed-box B at a small angle to facilitate the discharge of the seed. Between the bottom of B and the apron D is the additional slide e, Fig. 4, the design of which is to close the openings in B, so as to prevent waste of seed when turning at the end of a row. The slide e plays in grooves made near the ends of seed-box B. By drawing slide e forward the seed can pass through the openings in B without obstruction, and by pushing it in the opposite direction the openings will be all closed.

In Fig. 5 the letter g represents an ablong platform through which the harrow n is made to play longitudinally, the platform having an opening in it extending the whole distance between the two points t. From the points t outward to the ends the platform g is made a little thicker, so as to admit of a mortise through its ends corresponding in size with the opening in the remaining portion of platform g. Through these mortises the harrow n plays with a reciprocating motion by means of pitman k, the pitman being operated by the eccentric L. The harrow n will have two rows of teeth, as seen in Fig. 3, the rear row being placed opposite to the center of the spaces between the teeth in the front row. At the inner end of the harrow n there is an elevation, P, to which the end of slide C is fastened, so that C will partake of the motion of the harrow.

S S designate the wheels, upon which the platform g rests.

T represents a metal plate, by which the seeder B is confined to the carriage A.

It will be seen that a lateral motion is given to the harrow by means of pitman k and the eccentric L.

The advantages we claim for our harrow are, that it pulverizes the earth better than any now in use. In those harrows which have only a progressive motion the hard clods of earth, if large, will be dragged along by the teeth, and, if small, will pass between them; but our harrow having a lateral as well as a progressive motion, it is impossible for the clods to escape or avoid the crushing effects of the teeth.

Having thus described our invention, what we claim, and desire to secure by Letters Patent, is—

1. The harrow n, constructed and operated substantially as herein described.

2. The harrow n, in combination with the seeder B, the whole constructed and operated substantially as and for the purpose herein set forth.

D. L. BARLOW.
J. M. BARLOW.

Witnesses:
 A. B. DURFEE,
 B. F. FRY.